US011293355B2

(12) United States Patent
 Komoto

(10) Patent No.: US 11,293,355 B2
(45) Date of Patent: Apr. 5, 2022

(54) ELECTRONICALLY CONTROLLED THROTTLE DEVICE FOR ENGINE

(71) Applicant: MIKUNI CORPORATION, Tokyo (JP)

(72) Inventor: Yoshinobu Komoto, Odawara (JP)

(73) Assignee: MIKUNI CORPORATION, Tokyo (JP)

(*) Notice: Subject to any disclaimer, the term of this patent is extended or adjusted under 35 U.S.C. 154(b) by 0 days.

(21) Appl. No.: 17/263,057

(22) PCT Filed: Aug. 23, 2018

(86) PCT No.: PCT/JP2018/031216
 § 371 (c)(1),
 (2) Date: Jan. 25, 2021

(87) PCT Pub. No.: WO2020/039564
 PCT Pub. Date: Feb. 27, 2020

(65) Prior Publication Data
 US 2021/0293186 A1    Sep. 23, 2021

(51) Int. Cl.
 *F02D 9/10*     (2006.01)
 *G01D 5/20*     (2006.01)
 *F02D 11/10*    (2006.01)

(52) U.S. Cl.
 CPC ........... *F02D 9/1065* (2013.01); *F02D 9/105* (2013.01); *F02D 11/106* (2013.01); *G01D 5/20* (2013.01);
 (Continued)

(58) Field of Classification Search
 CPC ...... F02D 9/105; F02D 9/1065; F02D 11/106; F02D 2200/0404; G01D 5/145; G01D 5/20
 (Continued)

(56) References Cited

U.S. PATENT DOCUMENTS

| 6,288,534 B1* | 9/2001 | Starkweather | .......... F02D 11/10 |
| | | | 123/617 |
| 7,323,866 B1* | 1/2008 | Uryu | ...................... G01D 5/145 |
| | | | 324/207.25 |
| 7,352,174 B1 | 4/2008 | Lee | |

(Continued)

FOREIGN PATENT DOCUMENTS

| JP | 3-37241 | 4/1991 |
| JP | 2005-48671 | 2/2005 |

(Continued)

OTHER PUBLICATIONS

International Search Report, dated Nov. 20, 2018, in International Application No. PCT/JP2018/031216 (4 pp.).

*Primary Examiner* — John M Zaleskas

(57) ABSTRACT

Provided is an electronically controlled throttle device for an engine driving to open and close a throttle valve (8) of a valve body (3) to which rotation of a motor (15) is transmitted from a driven gear (14) via a throttle shaft (6), and disposing a substrate (22) on which an excitation conductor (23) and a signal detection conductor (24) are arranged to face an exciting conductor (21) rotating together with the throttle shaft (6). The driven gear (14) comprises an embedded core metal (25), and has one side surface to which an exciting conductor (21) is exposed, the core metal (25) and the exciting conductor (21) being insert-Molded of a synthetic resin material and prepared, and a caulked portion (6*a*) of the throttle shaft (6) is inserted and fixed into a shaft hole (25*a*) extending through the core metal (25).

12 Claims, 9 Drawing Sheets

(52) U.S. Cl.
CPC ............... *G01D 5/2046* (2013.01); *F02D 2200/0404* (2013.01)

(58) Field of Classification Search
USPC .......................................... 324/207.2, 207.25
See application file for complete search history.

(56) References Cited

U.S. PATENT DOCUMENTS

| | | | | |
|---|---|---|---|---|
| 8,947,077 B2* | 2/2015 | Lee | ................ | G01D 5/2046 324/207.25 |
| 2002/0130656 A1* | 9/2002 | Hagio | ................ | F16K 37/0033 324/207.2 |
| 2004/0035193 A1* | 2/2004 | Morimoto | ............ | F02D 11/106 73/114.37 |
| 2004/0108483 A1* | 6/2004 | Fauni | ................ | B29C 45/14377 251/129.11 |
| 2005/0022785 A1* | 2/2005 | Kurita | ................ | F02D 9/1065 123/399 |
| 2005/0028871 A1* | 2/2005 | Kurita | ................ | F16K 37/0041 137/554 |
| 2005/0092956 A1* | 5/2005 | Fauni | ................ | F02D 11/107 251/305 |
| 2005/0263731 A1* | 12/2005 | Fauni | ................ | F02D 9/1065 251/129.11 |
| 2006/0157027 A1* | 7/2006 | Ichikawa | ............ | F02D 9/105 123/399 |
| 2007/0000455 A1* | 1/2007 | Akiyama | ............ | F02D 11/106 123/19 |
| 2007/0006846 A1* | 1/2007 | Wendel | ................ | F02D 9/1065 123/399 |
| 2007/0169744 A1* | 7/2007 | Maruo | ................ | F02D 11/107 123/397 |
| 2008/0022970 A1* | 1/2008 | Maruo | ................ | F02D 41/22 123/399 |
| 2008/0087858 A1* | 4/2008 | Hatsuzawa | ............ | F02D 9/105 251/129.11 |
| 2008/0110436 A1* | 5/2008 | Baasch | ................ | F02D 11/106 123/399 |
| 2010/0050984 A1* | 3/2010 | Kato | ................ | F02D 9/1065 123/337 |
| 2010/0155637 A1* | 6/2010 | Mita | ................ | G01D 5/2073 251/129.04 |
| 2010/0319658 A1* | 12/2010 | Uchiyama | ............ | G01D 5/2086 123/337 |
| 2011/0050212 A1* | 3/2011 | Henning | ................ | G01D 5/145 324/207.25 |
| 2011/0290213 A1* | 12/2011 | Ishikawa | ................ | F02D 9/1065 123/336 |
| 2012/0304964 A1* | 12/2012 | Nemoto | ................ | F02D 9/10 123/399 |
| 2013/0063137 A1* | 3/2013 | Ikeda | ................ | G01D 5/145 324/207.25 |
| 2013/0068978 A1* | 3/2013 | Hiranuma | ............ | F02D 11/106 251/129.12 |
| 2013/0112168 A1* | 5/2013 | Uchiyama | ............ | G01D 11/24 123/337 |
| 2013/0133617 A1* | 5/2013 | Machida | ................ | F02D 9/109 123/336 |
| 2013/0233277 A1* | 9/2013 | Uchiyama | ................ | F02D 9/105 123/337 |
| 2014/0043020 A1* | 2/2014 | Nishikawa | ............ | F02D 9/105 324/207.25 |
| 2019/0226408 A1* | 7/2019 | Hamasaki | ............ | F02M 35/162 |
| 2019/0277203 A1* | 9/2019 | Hamasaki | ................ | F02D 11/10 |

FOREIGN PATENT DOCUMENTS

| | | | | |
|---|---|---|---|---|
| JP | 2007-198217 | | 8/2007 | |
| JP | 2007198217 A | * | 8/2007 | |
| JP | 2008309598 A | * | 12/2008 | ........... F02D 9/1035 |
| JP | 2010019137 A | * | 1/2010 | ........... F02D 9/1065 |
| JP | 2011080390 A | * | 4/2011 | ........... F02D 9/1035 |
| JP | 2012-247279 | | 12/2012 | |
| JP | 2012-247323 | | 12/2012 | |
| JP | 2014105691 A | * | 6/2014 | |
| JP | 2017142100 A | * | 8/2017 | ........ B29C 45/14377 |
| WO | WO-2007098191 A2 | * | 8/2007 | ........ B29C 45/14377 |
| WO | WO-2016012709 A1 | * | 1/2016 | ................ F16K 1/22 |
| WO | WO-2018150821 A1 | * | 8/2018 | ........ F16K 27/0218 |

* cited by examiner

1

ELECTRONICALLY CONTROLLED THROTTLE DEVICE FOR ENGINE

CROSS REFERENCE TO RELATED APPLICATION

This Application is a U.S. National Stage Application which claims the benefit under 35 U.S.C. § 371 of International Patent Application No. PCT/JP2018/031216 filed on Aug. 23, 2018, which is incorporated herein by reference in its entirety.

TECHNICAL FIELD

The present invention relates to an electronically controlled throttle device that drives a motor to open and close a throttle valve, and detects a throttle position with an inductive throttle sensor.

BACKGROUND ART

In a conventional throttle device that mechanically drives to open and close a throttle valve via an accelerator wire, a relation between an accelerator operation amount and a throttle position is uniquely determined, and hence there is room for improvement in engine performance and exhaust gas characteristics. To solve this problem, an electronically controlled throttle device that drives a motor to open and close a throttle valve based on a target throttle position calculated from an accelerator operation amount or the like is put to practical use. To operate this type of throttle device, it is necessary to compare the target throttle position with an actual throttle position, and hence, for example, in a throttle device described in Patent Document 1, an inductive throttle sensor is provided to detect a throttle position.

Technology of Patent Document 1 is described in which a throttle shaft is coupled to a throttle valve provided in a throttle bore of a valve body, and one end of the throttle shaft extends through a shaft hole of a driven gear to be fixed with a nut. A drive gear of a motor meshes with the driven gear via an intermediate gear, and rotation of the motor is decelerated via each gear and transmitted to the throttle shaft. Consequently, the throttle valve is driven to open and close in accordance with a rotating direction of the motor, and intake air flowing through the throttle bore to an engine is adjusted.

The inductive throttle sensor as a whole comprises a rotor provided with an exciting conductor, and a substrate provided with an excitation conductor and a signal detection conductor. To the one end of the throttle shaft protruding from the driven gear, the rotor is fixed, and the exciting conductor is provided on one side surface of this rotor. The rotor is made of a synthetic resin material, and insert-molded together with the exciting conductor in the end of the throttle shaft. The substrate is disposed so that the excitation conductor and signal detection conductor face the exciting conductor of the rotor.

PRIOR ART DOCUMENT

Patent Document

Patent Document 1: Japanese Patent Laid-Open No. 2012-247323

SUMMARY OF THE INVENTION

Problems to be Solved by the Invention

A throttle device of Patent Document 1 is constituted as described above, but it is not easily considered that in a manufacturing process, operability in assembling a driven gear and a rotor to an end of a throttle shaft is satisfactory.

That is, the drive gear and rotor are individually fixed to the end of the throttle shaft, and are also totally different in fixing method. Therefore, an assembling operation first includes fitting the driven gear into the end of the throttle shaft and fixing the gear with a nut. Then, the rotor is insert-molded together with a pre-molded exciting conductor in the end of the throttle shaft that protrudes from the driven gear.

Consequently, to the end of the throttle shaft, assembling of the driven gear by a manual operation and insert-molding of the rotor are performed in succession, which results in very cumbersome operation content. Additionally, this insert-molding operation needs to be performed on the end of the throttle shaft to which the driven gear is already fixed. Thus, a structure of a mold is complicated, and members are hard to handle during the molding operation. Such respects also decrease the operability.

The present invention has been developed to solve such problems, and an object thereof is to provide an electronically controlled throttle device for an engine in which a driven gear transmitting rotation from a motor and an exciting conductor constituting a throttle sensor can be efficiently assembled to an end of a throttle shaft.

Means for Solving the Problems

In order to achieve the above object, an aspect of the present invention is directed to an electronically controlled throttle device for an engine, driving to open and close a throttle valve in a throttle bore formed in a valve body, by rotation of a motor transmitted to a driven gear, via a throttle shaft coupled to the driven gear, and comprising a throttle sensor including a substrate on which an excitation conductor and a signal detection conductor are arranged to face an exciting conductor rotating together with the throttle shaft, wherein the driven gear comprises an embedded core metal, and has one side surface to which the exciting conductor is exposed, the core metal and the exciting conductor being insert-molded of a synthetic resin material, and the throttle shaft is inserted and fixed into a shaft hole extending through the core metal (Claim 1).

As another aspect, it is preferable that a first opening is formed in a center of a gear body of the driven gear made of the synthetic resin material, a second opening corresponding to the first opening of the gear body is formed in a center of the exciting conductor, and a return portion embedded in the gear body to prevent the exciting conductor from being peeled from one side surface of the gear body is formed on an inner peripheral edge of the second opening (Claim 2).

As still another aspect, it is preferable that an engagement portion to determine a phase of the exciting conductor to the driven gear is formed on the inner peripheral edge of the second opening of the exciting conductor, and the return portion of the exciting conductor is formed in a region excluding the engagement portion of the inner peripheral edge of the second opening (Claim 3).

As a further aspect, it is preferable that the throttle sensor is disposed on one side of the valve body being singular, and an end of the throttle shaft is inserted in the shaft hole of the core metal of the driven gear, and has a protruding portion protruding from the shaft hole and fixed by caulking (Claim 4).

As a still further aspect, it is preferable that the throttle sensor is disposed between a pair of the valve bodies, the throttle shaft extends from one of the valve bodies through the shaft hole of the core metal of the driven gear to the other valve body, and a pin extends through the driven gear and the throttle shaft to be pressed and fixed (Claim 5).

Advantageous Effects of the Invention

According to an electronically controlled throttle device for an engine of the present invention, a driven gear transmitting rotation from a motor and an exciting conductor constituting a throttle sensor can be efficiently assembled to an end of a throttle shaft.

MODE FOR CARRYING OUT THE INVENTION

Hereinafter, an embodiment will be described in which the present invention is embodied in an electronically controlled throttle device (hereinafter, may be referred to simply as the throttle device) for a motorcycle engine, including a single throttle bore.

Figure 1:
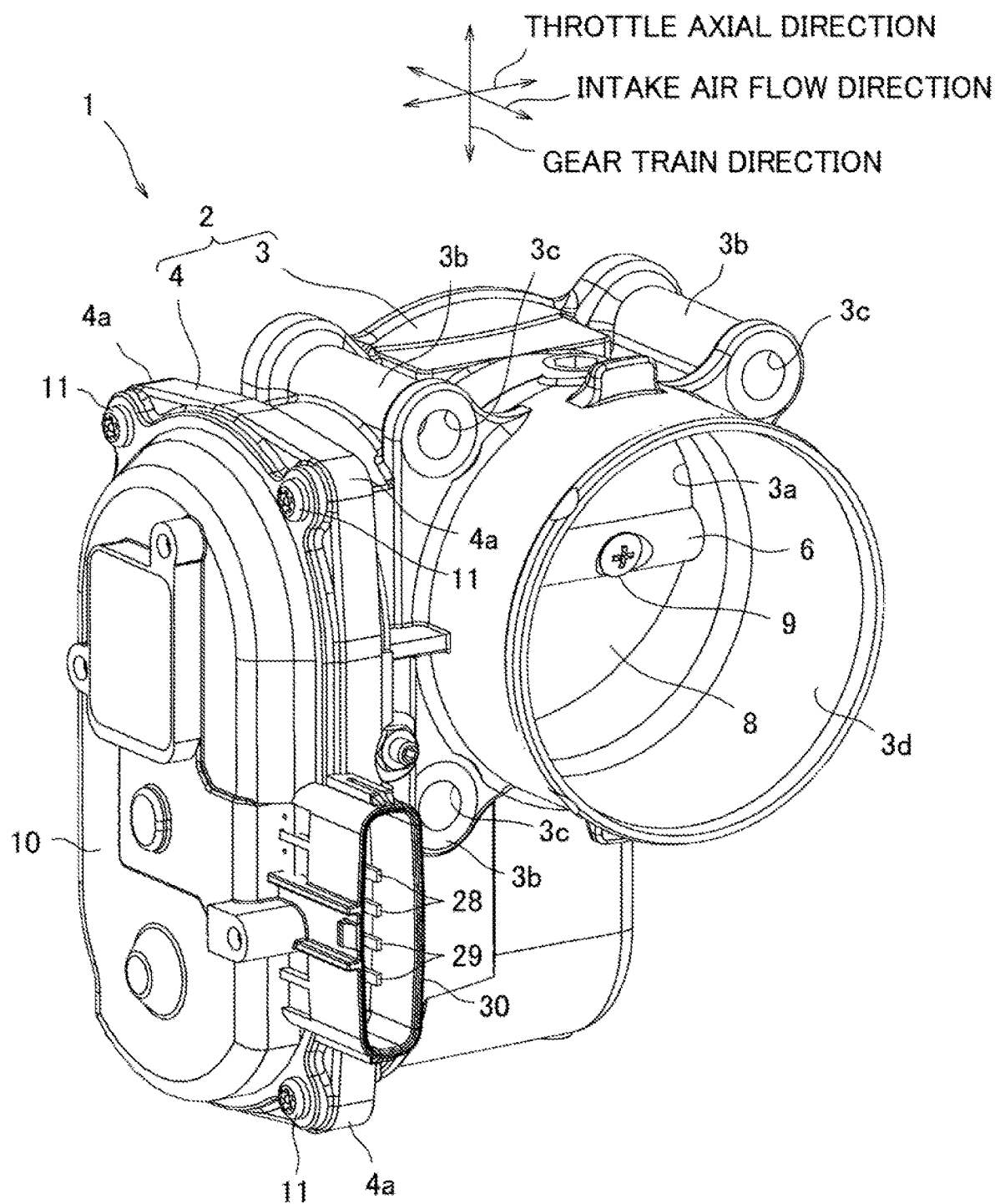
FIG. 1 is a perspective view showing an electronically controlled throttle device for an engine of an embodiment.
Figure 2:
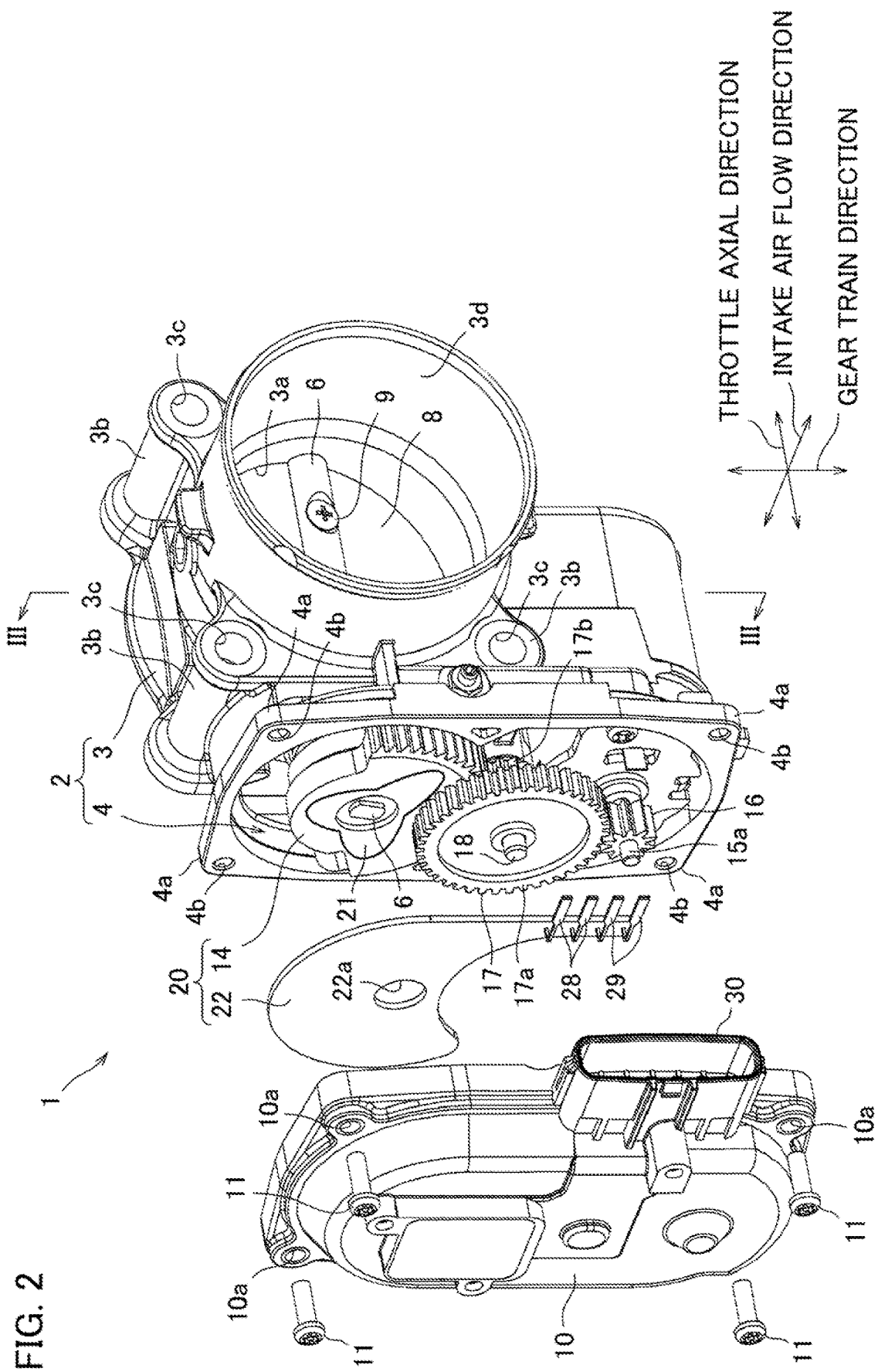
FIG. 2 is an exploded perspective view showing the electronically controlled throttle device from which a cover and a substrate are removed.
Figure 3:
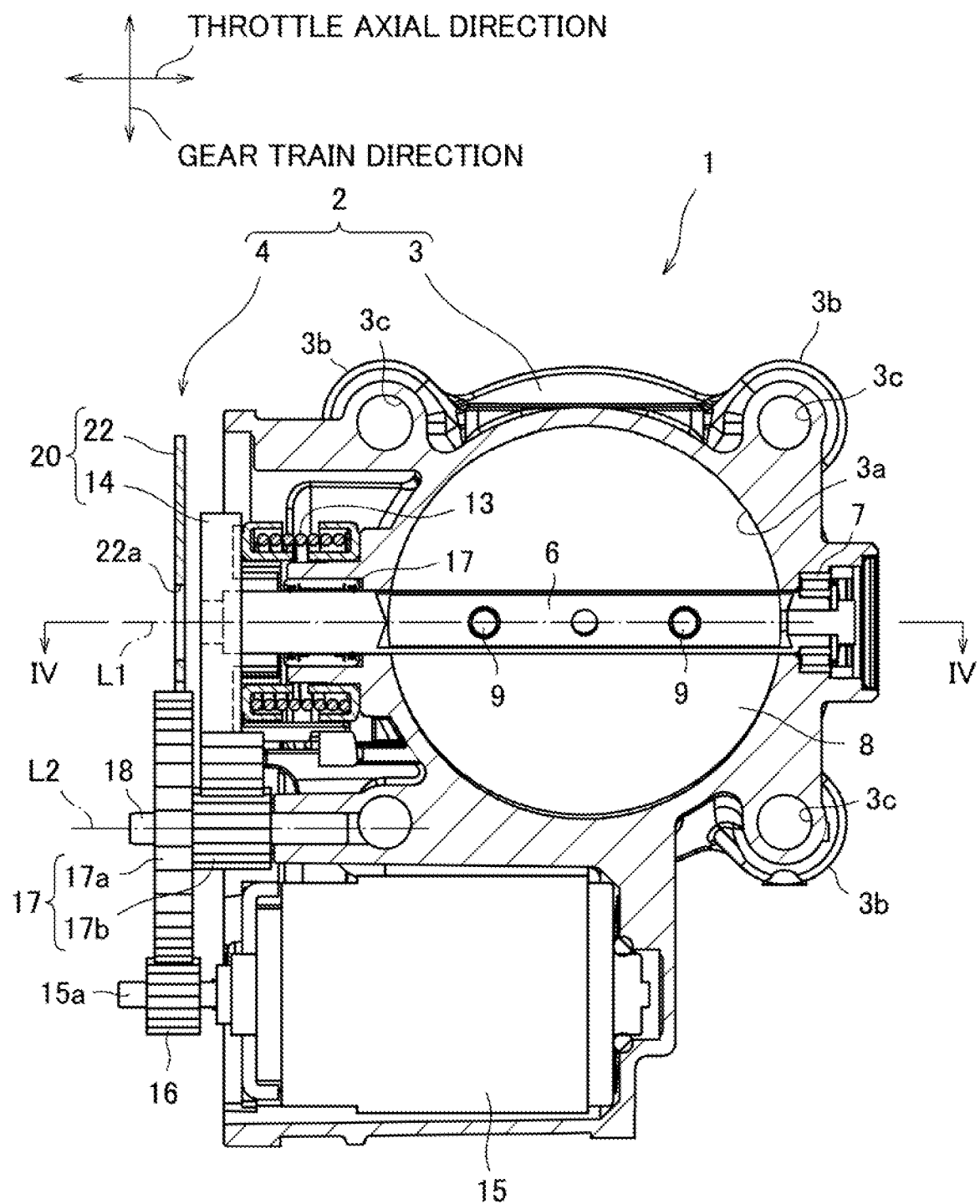
FIG. 3 is a cross-sectional view taken along the III-III line of FIG. 2 showing the electronically controlled throttle device.
Figure 4:
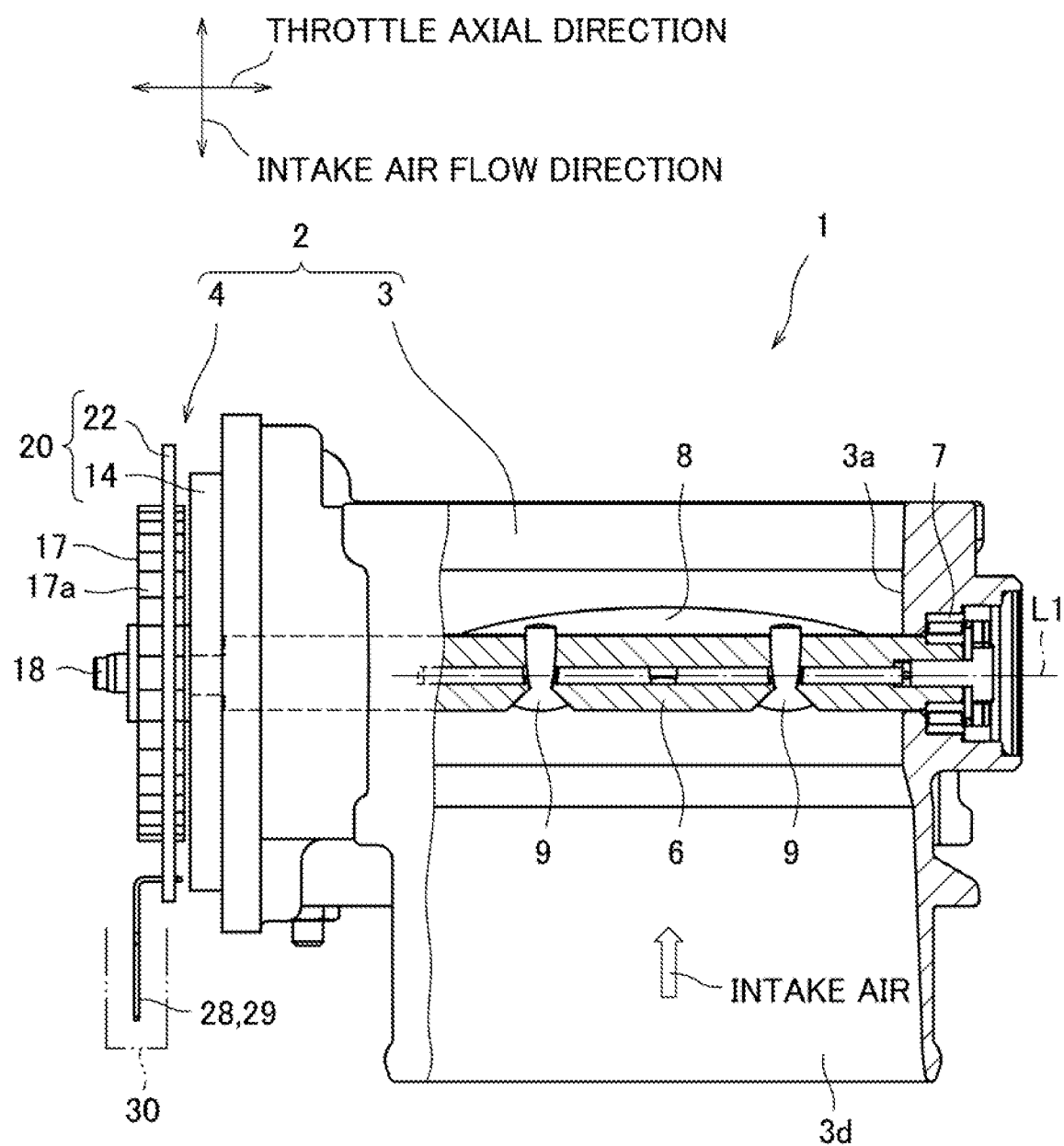
FIG. 4 is a cross-sectional view taken along the IV-IV line of FIG. 3 showing the electronically controlled throttle device.

FIG. 1 is a perspective view showing the electronically controlled throttle device for the engine of the present embodiment, FIG. 2 is an exploded perspective view showing the electronically controlled throttle device from which a cover and a substrate are removed, FIG. 3 is a cross-sectional view taken along the III-III line of FIG. 2 showing the electronically controlled throttle device, and FIG. 4 is a cross-sectional view taken along the IV-IV line of FIG. 3 showing the electronically controlled throttle device.

As shown in FIG. 2, a casing 2 of a throttle device 1 comprises a valve body 3 formed with a cylindrical throttle bore 3a and a gear housing chamber 4 housing a gear train, and these members 3, 4 are integrally formed by aluminum die casting. Note that a material of the casing 2 is not limited to this example, and can be arbitrarily changed.

As shown in FIGS. 3, 4, four flanges 3b including bolt holes 3c extending therethrough are formed around the throttle bore 3a of the valve body 3, and the throttle device 1 is assembled to a manifold of the engine with an unshown bolt through each bolt hole 3c. Furthermore, the other end of the valve body 3 protrudes as a cylindrical hose connecting portion 3d on one side (downside of FIG. 4), and is connected to a hose from an unshown air cleaner. In an assembled state to the engine, the throttle bore 3a functions as a part of an intake air passage, and guides intake air to the engine along an intake air flow direction.

In the valve body 3, a throttle shaft 6 is disposed to cross the throttle bore 3a, and the throttle shaft 6 has opposite ends rotatably supported by bearings 7. Hereinafter, a direction along an axis L1 of the throttle shaft 6 will be referred to as a throttle axial direction. In the throttle bore 3a, a throttle valve 8 is coupled to the throttle shaft 6 with screws 9, and with rotation of the throttle shaft 6, a position of the throttle valve 8 is changed, to adjust intake air flowing through the throttle bore 3a.

As shown in FIGS. 2, 3, one end of the throttle shaft 6 protrudes into the gear housing chamber 4 formed adjacent to the valve body 3, and the gear housing chamber 4 has an almost rectangular shape opened toward one side, and includes internal screws 4b formed in flanges 4a formed at four corners. In an opening of the gear housing chamber 4, an almost rectangular cover 10 is disposed, and bolts 11 are screwed into the internal screws 4b of the gear housing chamber 4 via bolt holes 10a extending through four corners, respectively. Consequently, the cover 10 is fastened, and the gear housing chamber 4 is sealed and closed.

In the gear housing chamber 4, a torsion spring 13 is disposed to surround the throttle shaft 6, and a driven gear 14 is fixed to the end of the throttle shaft 6. As shown in FIG. 2, the driven gear 14 forms a fan shape corresponding to an angle region required to open and close the throttle valve 8, and is rotated to abut on an unshown fully opened stopper and fully closed stopper provided in the gear housing chamber 4, whereby the position of the throttle valve 8 is regulated between a fully opened position and a fully closed position.

Although not shown in the drawings, one end of the torsion spring 13 is hung onto the driven gear 14, and the other end of the torsion spring 13 is hung onto the casing 2, whereby the throttle valve 8 is urged at a predetermined position between the fully opened position and the fully closed position. In a case where the throttle valve 8 cannot be driven due to failure of an after-mentioned motor 15 or the like, the throttle valve 8 is held at the predetermined position by the torsion spring 13, to acquire an amount of intake air required for vehicle running in a limp home mode, and eventually engine output.

However, an urged state of the torsion spring 13 is not limited to this example, and the spring may be urged, for example, at the fully closed position of the throttle valve 8.

As shown in FIG. 3, the motor 15 is contained adjacent to the throttle bore 3a on one side of the valve body 3, and an output shaft 15a of the motor 15 protrudes into the gear housing chamber 4, to which a drive gear 16 is fixed. An intermediate gear 17 is disposed between the drive gear 16 and the driven gear 14 in the gear housing chamber 4, and rotatably supported by a gear shaft 18 along an axis L2.

The intermediate gear 17 is integrally formed of a large-diameter input gear 17a and a small-diameter output gear 17b. The input gear 17a of the intermediate gear 17 meshes with the drive gear 16, and the output gear 17b of the intermediate gear 17 meshes with the driven gear 14. Consequently, in the gear housing chamber 4, the respective gears 14, 16, 17 are arranged in a gear train direction, and this gear train direction, the intake air flow direction and the throttle axial direction are in a mutually orthogonal relation. Furthermore, the rotation of the motor 15 is decelerated via the drive gear 16, the intermediate gear 17 and the driven gear 14 and transmitted to the throttle shaft 6, and the throttle valve 8 is driven to open and close in accordance with a rotating direction of the motor 15.

The throttle device 1 including the above configuration is provided with an inductive throttle sensor 20 to detect the position of the throttle valve 8. For example, a general throttle sensor described in Patent Document 1 comprises a rotor provided with an exciting conductor, and a substrate provided with an excitation conductor and a signal detection conductor. Furthermore, as described in [Problems to be solved by the Invention], a driven gear and the rotor are individually fixed to an end of a throttle shaft, and are also totally different in fixing method. Consequently, it cannot be easily considered that assembling operability is satisfactory.

In view of such disadvantages, the present inventors have found a countermeasure that the driven gear 14 also functions as the rotor. That is, the driven gear 14 transmitting rotation from the motor 15 to the throttle valve 8 is an essential member to be fixed to the throttle shaft 6. Furthermore, the driven gear 14 completely assembled to the valve body 3 rotates together with the throttle shaft 6, and therefore functions also as the rotor.

Therefore, the driven gear 14 beforehand provided with an exciting conductor 21 is prepared by insert-molding, and the driven gear 14 is fixed to the throttle shaft 6. In this configuration, the driven gear 14 is only fixed to the throttle shaft 6, and a fixing method includes a single manual operation. Additionally, an insert-molding operation may be performed on the driven gear 14 alone regardless of the throttle shaft 6. Therefore, a structure of a mold can be simplified, and members are easy to handle during the molding operation.

The present invention is based on the findings described above, and the driven gear 14 includes the exciting conductor 21 insert-molded thereto, and is fixed to the end of the throttle shaft 6. Hereinafter, this configuration will be described.

Figure 5:
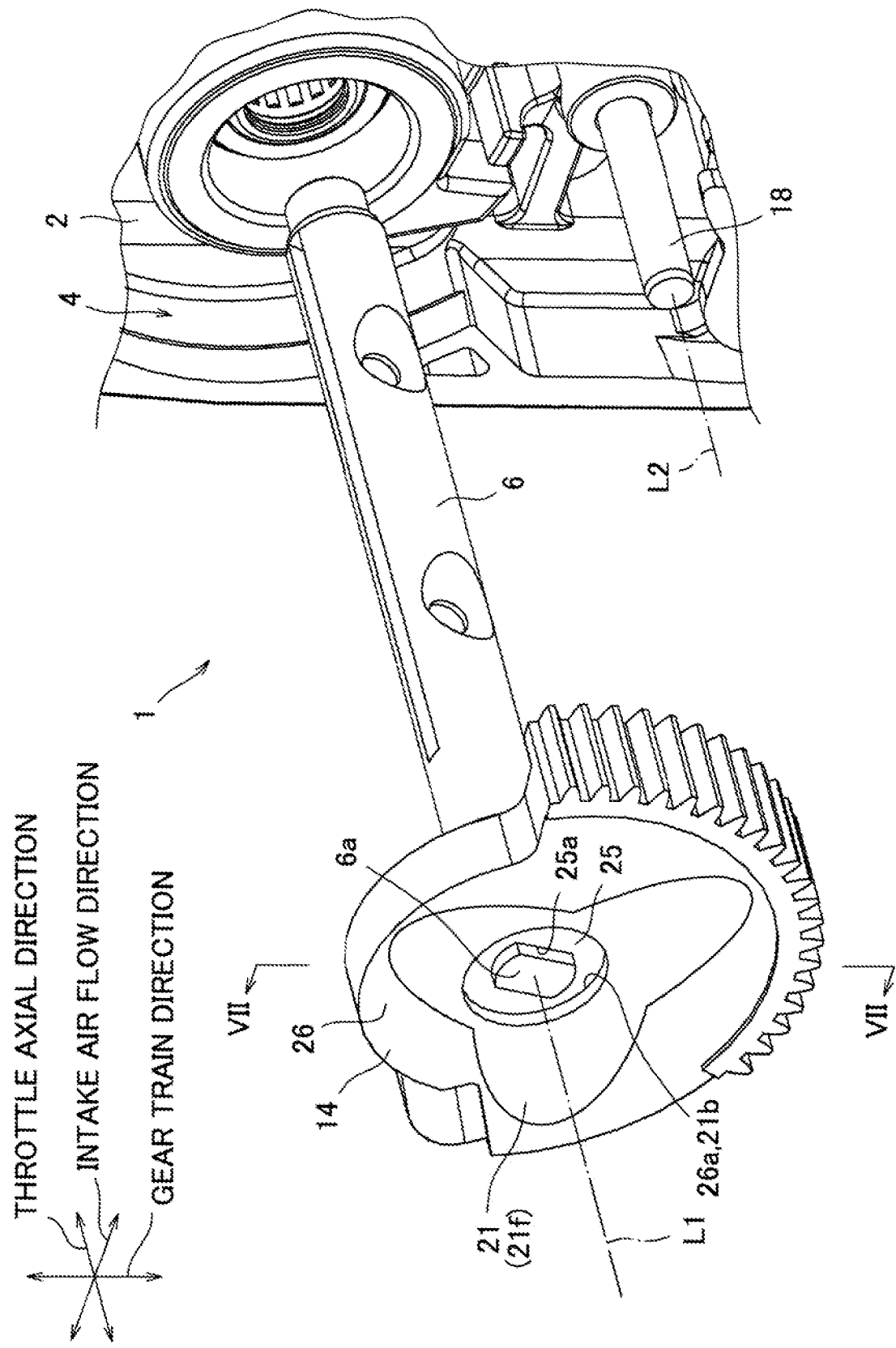
FIG. 5 is an exploded perspective view corresponding to FIG. 2 and showing relations among a throttle shaft, a driven gear and an exciting conductor.
Figure 6:
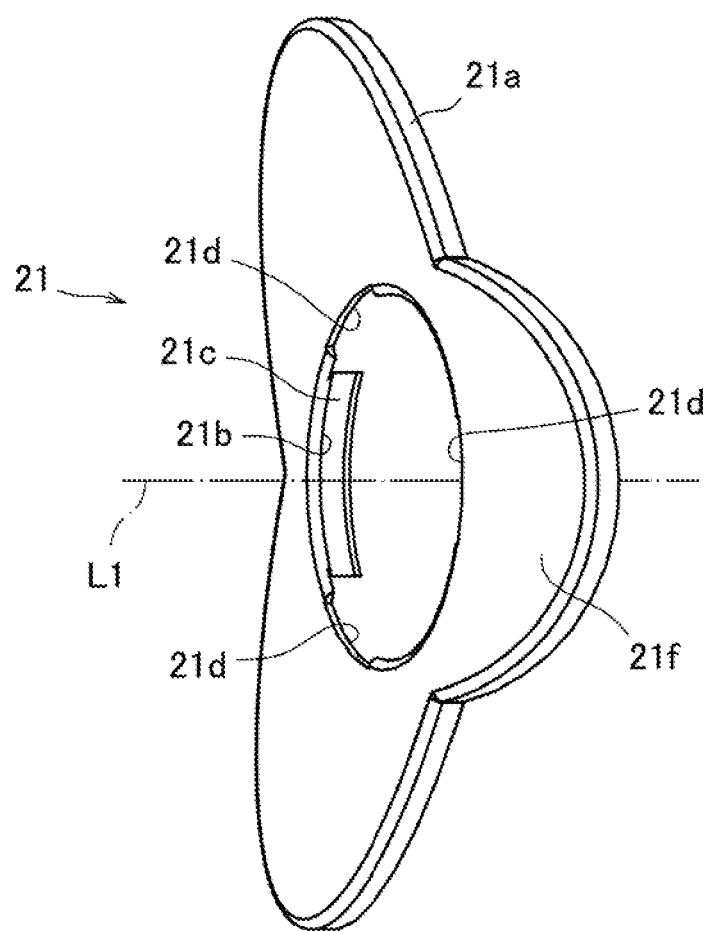
FIG. 6 is a perspective view showing the exciting conductor alone.
Figure 7:
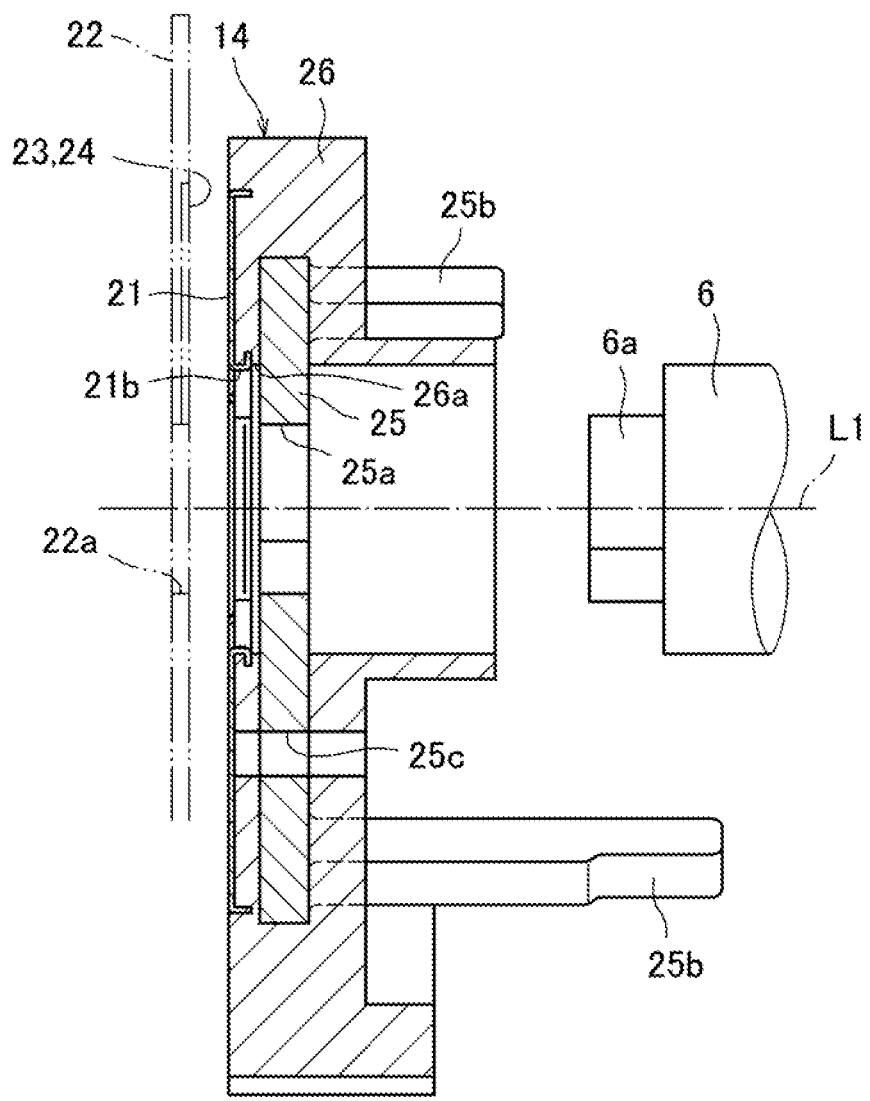
FIG. 7 is a cross-sectional view taken along the VII-VII line of FIG. 5 and showing an inserted state of a core metal and the exciting conductor in the driven gear.
Figure 8:
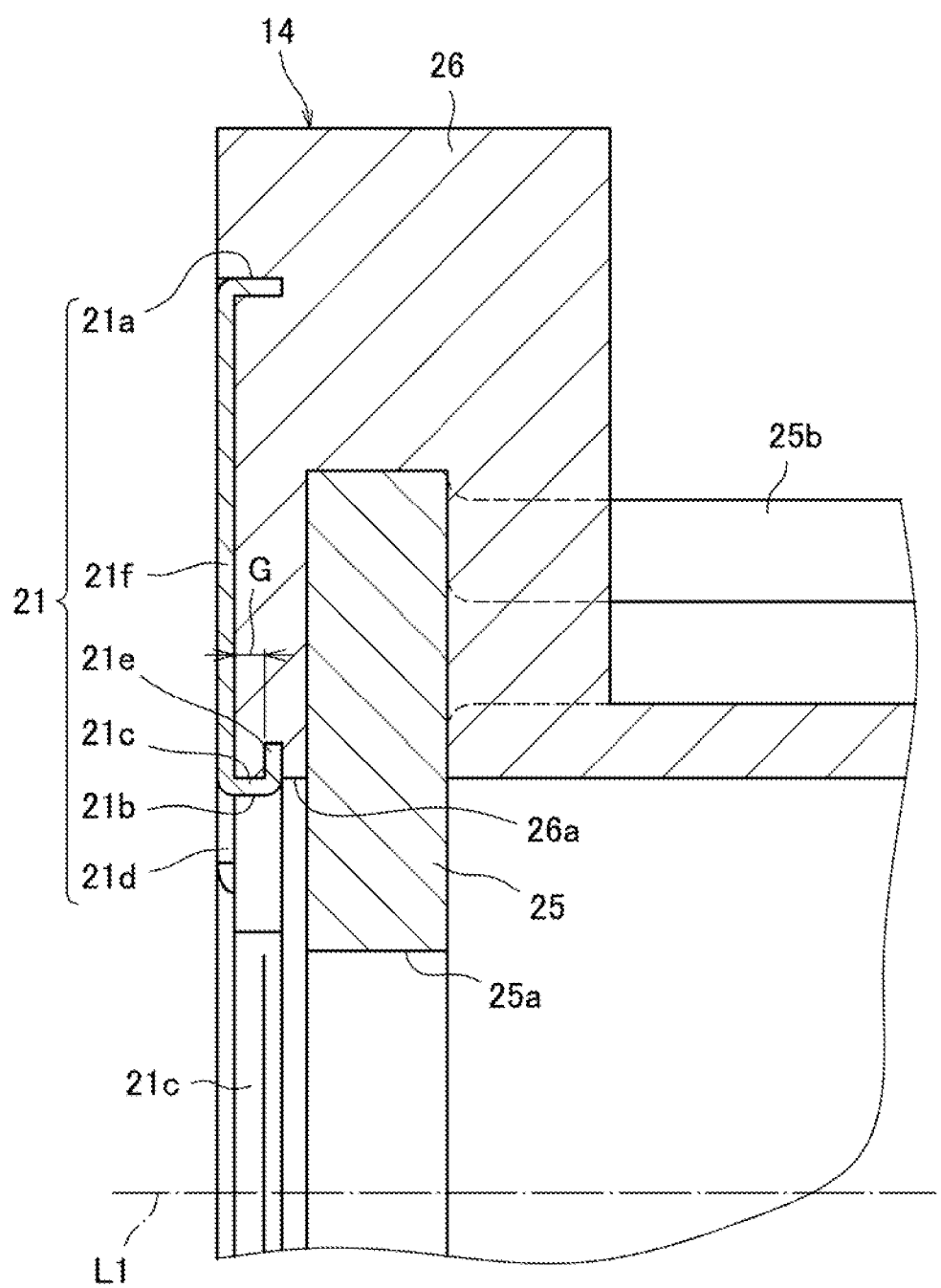
FIG. 8 is a partially enlarged cross-sectional view of FIG. 7.

FIG. 5 is an exploded perspective view corresponding to FIG. 2 and showing relations among the throttle shaft 6, the driven gear 14 and the exciting conductor 21, FIG. 6 is a perspective view showing the exciting conductor 21 alone, FIG. 7 is a cross-sectional view taken along the VII-VII line of FIG. 5 and showing an inserted state of a core metal and the exciting conductor 21 in the driven gear 14, and FIG. 8 is a partially enlarged cross-sectional view of FIG. 7.

The driven gear 14 comprises an embedded core metal 25 forming a disc shape, has one side surface to which the exciting conductor 21 is exposed, and is thus insert-molded of a synthetic resin material. Hereinafter, a part made of the synthetic resin material will be referred to as a gear body 26. A shaft hole 25a having a shape corresponding to a width across flats for rotation regulation is extended through a center of the core metal 25, and in a center of the one side surface of the gear body 26, a first opening 26a forming a round shape larger than the shaft hole 25a of the core metal 25 is formed to expose a portion around the shaft hole 25a. Such a configuration of the driven gear 14 is closely associated with a scope of the present invention, and hence details will be described later.

In the end of the throttle shaft 6 to which the driven gear 14 is fixed, a caulked portion 6a having a width across flats corresponding to the shaft hole 25a of the core metal 25 is formed. The caulked portion 6a of the throttle shaft 6 is inserted in the shaft hole 25a of the core metal 25 of the driven gear 14, and a step at a base end of the caulked portion 6a abuts on the side surface of the driven gear 14. Additionally, due to the width across flats, relative rotation with the driven gear 14 is regulated.

As shown in FIGS. 5, 7, the caulked portion 6a of the throttle shaft 6 protrudes from the shaft hole 25a of the core metal 25, and this protruding portion is subjected to high spin caulking and crushed via the first opening 26a of the gear body 26. Consequently, separation of the caulked portion 6a protruding from the shaft hole 25a of the core metal 25 is regulated, and the end of the throttle shaft 6 is fixed to the driven gear 14. This high spin caulking corresponds to caulking of the present invention.

Furthermore, as shown in FIGS. 2, 7, a substrate 22 is fixed to an inner surface of the cover 10 in the gear housing chamber 4, and an excitation conductor 23 and a signal detection conductor 24 are provided on a surface of the substrate 22 on a driven gear 14 side. Consequently, the exciting conductor 21 on the driven gear 14 side faces the excitation conductor 23 and the signal detection conductor 24 on a substrate 22 side via a micro gap.

Note that in FIG. 2, sign 22a denotes a positioning hole to position the substrate 22 to the cover 10. Furthermore, numerals 28, 29 denote power supply and signal output terminals, and a connector on a vehicle body side is connected to a connector 30 formed in cooperation with the cover 10, to perform supply of power, output of a throttle position signal, or the like.

Principle of the inductive throttle sensor 20 is well known, for example, from Patent Document 1, description of Japanese Patent No. 4809829 or the like, and hence only an outline will be described. Due to the power supply from outside, an alternating current flows through the excitation conductor 23 of the substrate 22, and accordingly current is excited in the exciting conductor 21 of the driven gear 14. The excited current excites an alternating current in the signal detection conductor 24 of the substrate 22, and based on this alternating current, the throttle position signal correlated with a rotation angle of the driven gear 14 and eventually the throttle position is generated.

On the other hand, the core metal 25 and exciting conductor 21 to be inserted in the driven gear 14 are beforehand prepared separately from the driven gear 14. The core metal 25 forms a disc shape as seen from the throttle axial direction, and as shown in FIG. 7, a pair of stopper portions 25b abutting on the fully opened and fully closed stoppers of the gear housing chamber 4 protrude from one side of the core metal.

Furthermore, as shown in FIG. 6, the exciting conductor 21 forms a thin plate-like shape as a whole, and is shaped so that three equally divided portions around the axis L1 (via a 120° interval) are bulged in an almost elliptic shape in a circumferential direction as seen from the throttle axial direction. However, the exciting conductor 21 is not limited to this shape, can be arbitrarily changed, and may be shaped so that, for example, two equally divided portions (via a 180° interval) or four equally divided portions (via a 90° interval) are bulged in the circumferential direction.

An entire circumference of the exciting conductor 21 is formed with an outer peripheral brim 21a having a cross-sectional shape bent at right angles toward the driven gear 14 side. Furthermore, a round second opening 21b corresponding to the first opening 26a of the driven gear 14 is formed in a center of the exciting conductor 21, and inner peripheral brims 21c each having a predetermined length in the circumferential direction are formed on three equally divided portions of an inner peripheral edge of the second opening 21b around the axis L1. Each of the inner peripheral brims 21c has a cross-sectional shape bent at right angles toward the driven gear 14 side in the same manner as in the outer peripheral brim 21a described above, and a region between the respective inner peripheral brims 21c is cut as an engagement portion 21d.

As shown in FIGS. 7, 8, a return portion 21e extends from each inner peripheral brim 21c. Each return portion 21e has a cross-sectional shape bent at right angles toward an outer peripheral side of the exciting conductor 21 (in a direction away from the axis L1), and forms a gap G between the portion and a main body 21f of the exciting conductor 21 exposed on the gear body 26.

The core metal 25 and exciting conductor 21 including such a configuration as described above are insert-molded to prepare the driven gear 14. Hereinafter, a procedure of the insert-molding operation will be described.

In the mold to be applied to the insert-molding, a cavity basically having a shape corresponding to an outer shape of the gear body 26 of the driven gear 14 shown in FIG. 7 formed, the core metal 25 and the exciting conductor 21 are arranged in the cavity, and the synthetic resin material is injected to mold the driven gear 14.

To arrange the core metal 25 and the exciting conductor 21 at predetermined positions in the cavity, the mold is provided with a large number of positioning pins. These positioning pins have a well-known configuration to be applied to the mold for the insert-molding, and hence only an outline will be described.

For example, in FIG. 7, the positioning pins are inserted from a right side in the drawing to a plurality of positioning holes 25c (only one is shown) extending through the core metal 25, to determine a phase of the core metal 25 around the axis L1 to the driven gear 14. Simultaneously, a tip of each positioning pin abuts on the exciting conductor 21, to determine a position of the exciting conductor 21 in the throttle axial direction, and the molded exciting conductor 21 is exposed to one side surface of the driven gear 14. Note that a position of the core metal 25 in the throttle axial direction is also determined by unshown positioning pins.

Although not shown in the drawing, three engagement portions protrude from an inner surface of the mold, corresponding to three engagement portions 21d formed on the inner peripheral edge of the second opening 21b of the exciting conductor 21. The engagement portions 21d of the exciting conductor 21 engage with the respective engagement portions of the mold in the cavity, respectively, to determine a phase of the exciting conductor 21 around the axis L1 to the driven gear 14.

As described above, the core metal 25 and the exciting conductor 21 are arranged at predetermined positions in the cavity, and the synthetic resin material is then injected to complete the molding of the driven gear 14.

As shown in FIGS. 7, 8, in the completely molded driven gear 14, the gear body 26 made of a synthetic resin has a predetermined shape, the core metal 25 is embedded in the gear body 26, and each stopper portion 25b protrudes to outside. Furthermore, the exciting conductor 21 is exposed on one side surface of the gear body 26, the outer peripheral brim 21a and three inner peripheral brims 21c of the exciting conductor 21 are embedded in the gear body 26 made of the synthetic resin, and three return portions 21e together with the respective inner peripheral brims 21c are also embedded in the gear body 26.

Furthermore, the main body 21f of the exciting conductor 21 exposed on one side surface of the gear body 26 faces each return portion 21e embedded in the gear body 26 via the gap G, and the resin forming the gear body 26 is present in the gap G. Consequently, to displace the exciting conductor 21 in a peeling direction from the side surface of the gear body 26, there occurs need for each return portion 21e to deform or destroy the resin present in the gap G. Therefore, the exciting conductor 21 is prevented from being peeled by each return portion 21e.

Furthermore, each return portion 21e exhibiting an effect of preventing the peeling is formed on the inner peripheral edge of the second opening 21b of the exciting conductor 21. Specifically, the inner peripheral edge of the second opening 21b of the exciting conductor 21 is formed with the engagement portion 21d to determine the phase of the exciting conductor 21 to the driven gear 14, and in a region between the respective engagement portions 21d, i.e., a region excluding each engagement portion 21d, the return portion 21e is formed together with the inner peripheral brim 21c. That is, a surplus region of the inner peripheral edge of the second opening 21b which is not used at all is utilized to form each return portion 21e.

For the exciting conductor 21 to exhibit an operation of exciting desired current responsive to energization of the excitation conductor 23 on the substrate 22 side, a shape of an outer peripheral edge of the exciting conductor 21 is especially important. To the contrary, a shape of an inner peripheral edge has less influence. As described above, the return portion 21e is formed in the surplus region of the inner peripheral edge of the second opening 21b. Consequently, the desired current exciting operation of the exciting conductor 21 is achieved, and then a totally separate effect of preventing the peeling of the exciting conductor 21 can be achieved, which can noticeably improve reliability of the throttle sensor 20.

Furthermore, as is clear from the above description, the insert-molding operation is performed by the driven gear 14 alone. In the throttle device of Patent Document 1, the insert-molding is targeted to the end of the throttle shaft already assembled with the driven gear. As compared to this device, the structure of the mold can be more simplified, and the members are easier to handle during the molding operation.

Additionally, the driven gear 14 is only fixed to the throttle shaft 6. In the throttle device of Patent Document 1, to the end of the throttle shaft, assembling of the driven gear by a manual operation and insert-molding of the rotor are required to be performed in succession. Unlike this device, in the present embodiment, the assembling of the driven gear 14 by the manual operation may only be performed.

The above factors are combined to improve operability in a manufacturing process. Consequently, according to the present embodiment, the driven gear 14 transmitting the rotation from the motor 15 and the exciting conductor 21 constituting the throttle sensor 20 can be efficiently assembled to the end of the throttle shaft 6.

As above, the description of the embodiment is finished, but the aspect of the present invention is not limited to this embodiment. For example, in the above embodiment, the invention is embodied in the electronically controlled throttle device 1 for the motorcycle engine, including the valve body 3 being singular, but is not limited to this embodiment. For example, the invention may be embodied in the throttle device 1 in which the gear housing chamber 4 and the throttle sensor 20 are arranged between a pair of the valve bodies 3. In this case, throttle valves 8 of the valve bodies 3 on opposite sides are coupled via the throttle shaft 6, and this structure requires the throttle shaft 6 to be disposed to extend through the driven gear 14.

Figure 9:
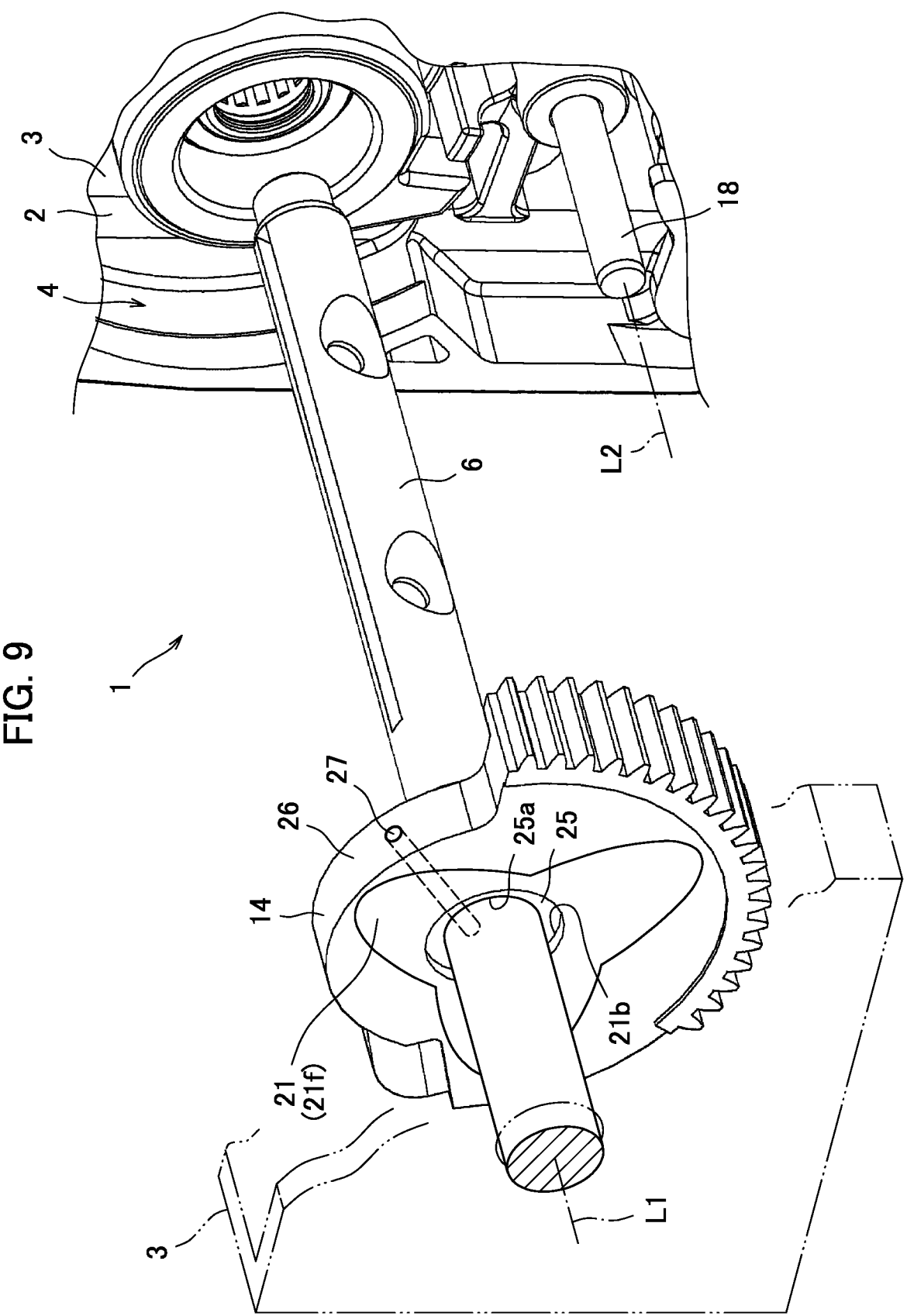
FIG. 9 is an exploded perspective view corresponding to FIG. 5 and showing another example where a gear housing chamber and a throttle sensor are arranged between a pair of valve bodies.

FIG. 9 is a perspective view corresponding to FIG. 5 and showing this separate example. In the same manner as in the above embodiment, a throttle shaft 6 is coupled to a throttle valve 8 of one valve body 3, and extends through a shaft hole 25a of a core metal 25 of a driven gear 14 to the other valve body 3 to be coupled to a throttle valve 8. In this case, both of the throttle shaft 6 and the shaft hole 25a have a round cross-sectional shape and rotation thereof is not regulated. Therefore, a pin 27 is passed through and pressed into the driven gear 14 and the throttle shaft 6 from a direction orthogonal to a throttle axial direction. Consequently, the driven gear 14 is fixed to the throttle shaft 6.

Also, in the throttle device including such a configuration, the driven gear 14 beforehand provided with the exciting conductor 21 is prepared by insert-molding, and is then fixed to the throttle shaft 6. Such a configuration can be employed, and hence redundant description will not be made, but operations and effects similar to those of the above embodiment can be achieved.

Furthermore, in the above embodiment, three inner peripheral brims 21c are formed on the inner peripheral edge of the second opening 21b of the exciting conductor 21, and the return portion 21e bent at right angles toward the outer peripheral side extends from each inner peripheral brim 21c, but the present invention is not limited to this embodiment. For example, a number of return portions 21e may be increased or decreased, and a cross-sectional shape of the return portion 21e may be changed.

EXPLANATION OF REFERENCE SIGNS

1 electronically controlled throttle device
3 valve body
3a throttle bore
6 throttle shaft
8 throttle valve
14 driven gear
15 motor
20 throttle sensor
21 exciting conductor
21b second opening
21d engagement portion
21e return portion
22 substrate
23 excitation conductor
24 signal detection conductor
25 core metal
25a shaft hole
26 gear body
26a first opening

The invention claimed is:

1. An electronically controlled throttle device for an engine, comprising:
a valve body with a throttle bore;
a throttle shaft disposed to cross the throttle bore;
a throttle valve coupled to the throttle shaft in the throttle bore;
a motor coupled to the throttle shaft via a driven gear so that the throttle valve is driven to open and close by rotation of the motor;
a throttle sensor including a substrate on which an excitation conductor and a signal detection conductor are arranged to face an exciting conductor rotating together with the throttle shaft, wherein
the driven gear comprises a gear body made of a synthetic material and a core metal embedded in the gear body, and has one side surface to which the exciting conductor is exposed, the core metal and the exciting conductor being insert-molded of a synthetic resin material,
the throttle shaft is inserted and fixed into a shaft hole extending through the core metal,
the driven gear includes a first opening formed in a center of the gear body of the driven gear, and
the exciting conductor includes a second opening corresponding to the first opening of the gear body formed in a center of the exciting conductor, an inner peripheral brim formed on an inner peripheral edge of the second opening and extending away from the excitation conductor, and a return portion extending from the inner peripheral brim and being embedded in the gear body so that a main body of the exciting conductor exposed to the one side surface of the gear body faces the return portion embedded in the gear body via a gap.

2. The electronically controlled throttle device for the engine according to claim 1, wherein
an engagement portion to determine a phase of the exciting conductor to the driven gear is formed on the inner peripheral edge of the second opening of the exciting conductor, and
the inner peripheral brim and the return portion of the exciting conductor are formed in a region excluding the engagement portion of the inner peripheral edge of the second opening.

3. The electronically controlled throttle device for the engine according to claim 2, wherein
the throttle sensor is disposed on one side of the valve body being singular,
the first opening forming a round shape larger than the shaft hole of the core metal is formed to expose a portion around the shaft hole,
the second opening forming a round shape corresponding to the first opening of the gear body in the center of the exciting conductor, and
an end of the throttle shaft is inserted in the shaft hole of the core metal of the driven gear, and has a protruding portion protruding from the shaft hole and fixed via the first opening of the gear body and the second opening of the exciting conductor by caulking.

4. The electronically controlled throttle device for the engine according to claim 2, wherein
the valve body is a first valve body, the throttle sensor is disposed between the first valve body and a second valve body,
the throttle shaft extends from the first valve body through the shaft hole of the core metal of the driven gear to the second valve body,
the first opening forming a round shape larger than the shaft hole of the core metal is formed to expose a portion around the shaft hole,
the second opening forming a round shape corresponding to the first opening of the gear body in the center of the exciting conductor, and
a pin extends through the driven gear and the throttle shaft and is pressed and fixed to the driven gear and the throttle shaft in the first opening of the gear body and the second opening of the exciting conductor.

5. The electronically controlled throttle device for the engine according to claim 1, wherein
the throttle sensor is disposed on one side of the valve body being singular,
the first opening forming a round shape larger than the shaft hole of the core metal is formed to expose a portion around the shaft hole,
the second opening forming a round shape corresponding to the first opening of the gear body in the center of the exciting conductor, and
an end of the throttle shaft is inserted in the shaft hole of the core metal of the driven gear, and has a protruding portion protruding from the shaft hole and fixed via the first opening of the gear body and the second opening of the exciting conductor by caulking.

6. The electronically controlled throttle device for the engine according to claim 1, wherein
the valve body is a first valve body, the throttle sensor is disposed between the first valve body and a second valve body,
the throttle shaft extends from the first valve body through the shaft hole of the core metal of the driven gear to the second valve body,
the first opening forming a round shape larger than the shaft hole of the core metal is formed to expose a portion around the shaft hole,
the second opening forming a round shape corresponding to the first opening of the gear body in the center of the exciting conductor, and
a pin extends through the driven gear and the throttle shaft and is pressed and fixed to the driven gear and the throttle shaft in the first opening of the gear body and the second opening of the exciting conductor.

7. The electronically controlled throttle device for the engine according to claim 1, wherein
the exciting conductor comprises a plurality of inner peripheral brims including the inner peripheral brim, the inner peripheral brims having a predetermined length in the circumferential direction are formed on three equally divided portions of the inner peripheral edge of the second opening around an axis,
each of the inner peripheral brims has a cross-sectional shape bent at right angles toward the excitation conductor.

8. The electronically controlled throttle device for the engine according to claim 7, wherein
an engagement portion to determine a phase of the exciting conductor to the driven gear by engaging with an engagement portion of a mold applied for insert-molding of the driven gear is formed on the inner peripheral edge of the second opening of the exciting conductor, and
the inner peripheral brim and the return portion of the exciting conductor are formed in a region excluding the engagement portion of the inner peripheral edge of the second opening.

9. The electronically controlled throttle device for the engine according to claim 8, wherein
the throttle sensor is disposed on one side of the valve body being singular,
the first opening forming a round shape larger than the shaft hole of the core metal is formed to expose a portion around the shaft hole,
the second opening forming a round shape corresponding to the first opening of the gear body in the center of the exciting conductor, and
an end of the throttle shaft is inserted in the shaft hole of the core metal of the driven gear, and has a protruding portion protruding from the shaft hole and fixed via the first opening of the gear body and the second opening of the exciting conductor by caulking.

10. The electronically controlled throttle device for the engine according to claim 8, wherein
the valve body is a first valve body, the throttle sensor is disposed between the first valve body and a second valve body,
the throttle shaft extends from the first valve body through the shaft hole of the core metal of the driven gear to the second valve body,
the first opening forming a round shape larger than the shaft hole of the core metal is formed to expose a portion around the shaft hole,
the second opening forming a round shape corresponding to the first opening of the gear body in the center of the exciting conductor, and
a pin extends through the driven gear and the throttle shaft and is pressed and fixed to the driven gear and the throttle shaft in the first opening of the gear body and the second opening of the exciting conductor.

11. The electronically controlled throttle device for the engine according to claim 7, wherein
the throttle sensor is disposed on one side of the valve body being singular,
the first opening forming a round shape larger than the shaft hole of the core metal is formed to expose a portion around the shaft hole,
the second opening forming a round shape corresponding to the first opening of the gear body in the center of the exciting conductor, and
an end of the throttle shaft is inserted in the shaft hole of the core metal of the driven gear, and has a protruding portion protruding from the shaft hole and fixed via the first opening of the gear body and the second opening of the exciting conductor by caulking.

12. The electronically controlled throttle device for the engine according to claim 7, wherein
the valve body is a first valve body, the throttle sensor is disposed between the first valve body and a second valve body,
the throttle shaft extends from the first valve body through the shaft hole of the core metal of the driven gear to the second valve body,
the first opening forming a round shape larger than the shaft hole of the core metal is formed to expose a portion around the shaft hole,
the second opening forming a round shape corresponding to the first opening of the gear body in the center of the exciting conductor, and
a pin extends through the driven gear and the throttle shaft and is pressed and fixed to the driven gear and the throttle shaft in the first opening of the gear body and the second opening of the exciting conductor.

* * * * *